Oct. 21, 1941.  A. WEISENBURG  2,259,914
DUPLEX CAN BODY WELDING MACHINE
Filed April 7, 1938  5 Sheets-Sheet 1

Inventor
Andrew Weisenburg
By Cushman Darby Cushman
Attorneys

Oct. 21, 1941.　　A. WEISENBURG　　2,259,914
DUPLEX CAN BODY WELDING MACHINE
Filed April 7, 1938　　5 Sheets-Sheet 5

Inventor
Andrew Weisenburg
By Cushman Darby & Cushman
Attorney

Patented Oct. 21, 1941

2,259,914

UNITED STATES PATENT OFFICE 2,259,914

DUPLEX CAN BODY WELDING MACHINE

Andrew Weisenburg, Philadelphia, Pa., assignor to Crown Can Company, Philadelphia, Pa., a corporation of Pennsylvania Application April 7, 1938, Serial No. 200,732

14 Claims. (Cl. 219—6)

The present invention relates to a can body welding machine.

It is a primary object of the present invention to increase the speed of production of machines of this character. More particularly, it is an object of the invention to perform a plurality of successive can body forming operations on different body forming blanks at the same time in a single machine. To this end, means are provided to form can bodies and to weld their side seams alternately by two sets of forming and welding instrumentalities. Also, the invention aims to utilize, substantially continuously, the electric welding current output of a single transformer to weld the side seams of can bodies, thereby making efficient use of the transformer and preventing the creation of intermittent heavy loads on the current supply line.

Thus, it is an object of the invention to provide a can body forming and welding machine which will utilize the output of a single transformer, substantially continuously, instead of intermittently, with relatively long periods of inactivity between the periods of use. In prior machines, the current from a single transformer is conducted to a single can body welding mechanism. During the can body forming operations of the machine, the welding mechanism is idle, and during the welding operation, the body forming mechanism is idle. This cycle of operation results in an inefficient, interrupted current consumption, with the consequence that an uneven load is placed upon the electric current supply line. Also, the prior machines are inefficient, since the transformer is operative to deliver welding current only about one-half of the time. During the other half of the time, the transformer is inoperative.

The method of the present invention makes maximum use of a single transformer, since the transformer alternately delivers welding current to a pair of welding mechanisms, timed to operate alternately. As a result, the output of the transformer is utilized substantially continuously and a substantially constant load is imposed on the current supply line.

It is a further object of the invention to interconnect two sets of can body blank feeding and forming mechanisms to operate in sequence, alternately, whereby blanks are fed into the machine alternately along two paths and are alternately formed into cylindrical shape for welding.

It is a further object to provide, in combination with such mechanisms, means for alternately welding the can bodies formed by the two forming mechanisms.

Other and further objects and advantages of the invention will become apparent from a consideration of the following description of a specific embodiment of the invention, shown in the accompanying drawings.

Figure 1:
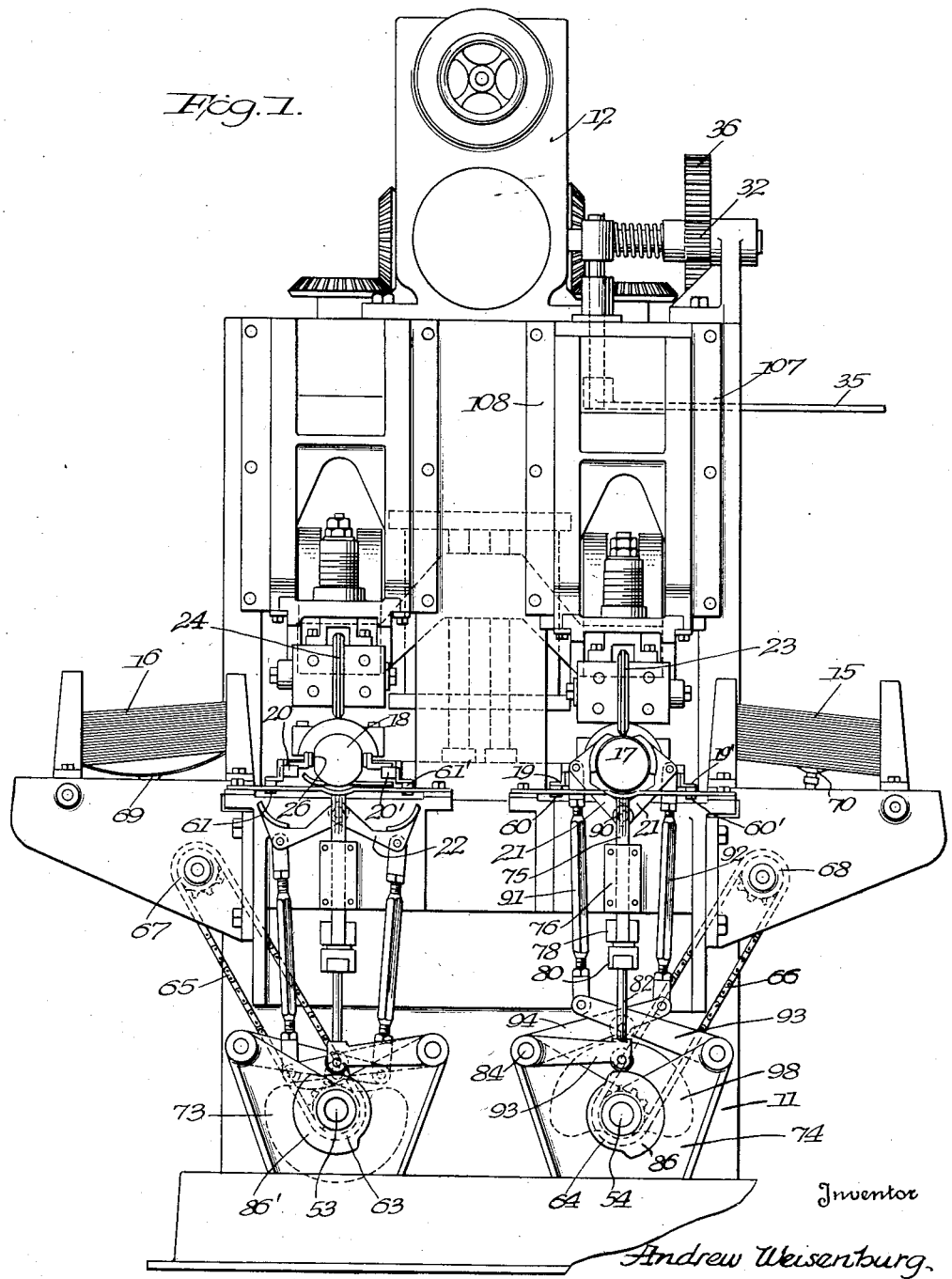
Figure 1 is a front elevation of a welding machine constructed in accordance with the invention.

For purposes of illustration, I have shown a welding machine having many details of construction similar to those embodied in the welding machine disclosed in the copending application of Graham et al., Serial No. 199,728, filed April 2, 1938. It must be understood that the invention is not limited to these details, because that machine has been used merely as a convenient means for illustrating the principles of the present invention. Reference is, therefore, made to that application for a specific disclosure of can blank feeding, forming and welding instrumentalities, suitable for use in accordance with the present invention. In the present application, the drawings and description are only sufficiently detailed to enable one skilled in the art to understand the principles of the invention. For further details, reference is made to the copending application.

As shown in the accompanying drawings, the machine comprises a base 10 having an upwardly projecting main frame 11 mounted thereon. At its upper end, the main frame supports a conventional speed change device in a casing 12 having an electric motor 13 associated therewith. A main driving pinion 14 projects from the casing 12 and is connected to drive the machine, as explained below.

Means are provided for feeding blanks alternately from two stacks of blanks 15, 16, laterally into the machine under forming and welding mandrels, 17, 18. Also, means in the form of reciprocating slides 19, 19', 20, 20' are provided to advance the blanks alternately, longitudinally of the mandrels 17, 18 from the infeed positions to the can body forming and welding positions adjacent the forward ends of the respective mandrels. The blanks may be wrapped around the mandrels at the forming positions by wings 21, 22, respectively or, on the other hand, they may be formed into cylindrical shape by forming rolls disposed interiorly and exteriorly of the mandrel, in a known manner. A pair of welding wheels 23, 24 are associated with the mandrels, to conduct, alternately, welding current from a single transformer 25 through the side seams of the respective can bodies and the associated mandrels. After the welding operation is complete, the welded can bodies are stripped alternately from the two mandrels by two pairs of forwardly projecting stripper fingers 26, 26' and 27, 27'.

Figure 5:
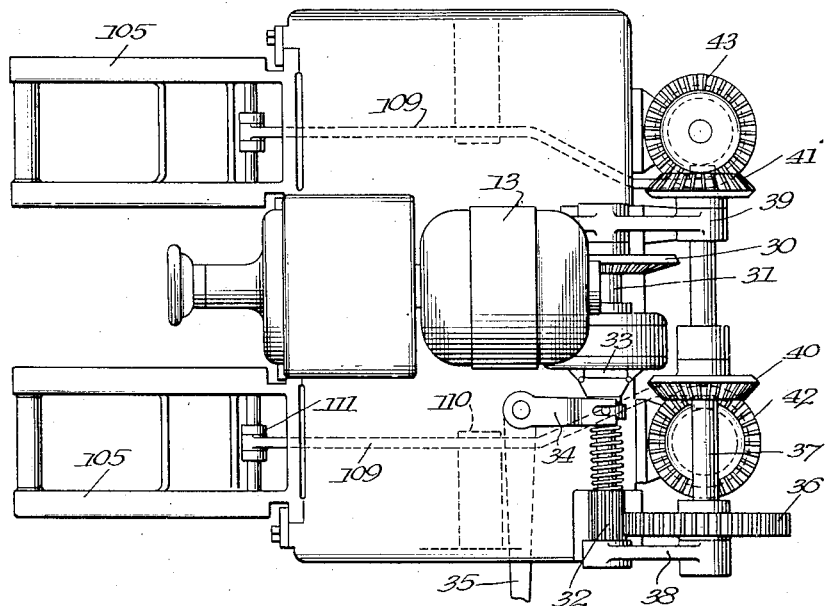
Figure 5 is a top plan view.

All of the various instrumentalities in the machine are inter-connected and driven to operate in predetermined timed relation to one another. The driving pinion 14 (Figs. 2 and 5) is in mesh with a gear 30 on a horizontally disposed upper shaft 31. The shaft 31 drives a spur gear 32 through a clutch 33 having an operating fork 34 connected to an operating handle 35. The gear 32 is in mesh with an enlarged gear 36 on a second upper horizontal shaft 37 mounted in brackets 38, 39 secured to the upper end of the rear of the frame 11. The shaft 37 carries a pair of fixed bevel gears 40, 41 in mesh, respectively, with similar gears 42, 43, fixed on the upper ends of vertical cam shafts 45, 46. The cam shafts 45, 46 carry cam barrels 47, 48, each provided with appropriate cam grooves connected through followers to control the movements of the welding wheels 23, 24, as explained below.

At their lower ends, the cam shafts 45, 46 carry bevel gears 49, 50 in mesh with similar gears 52, 51, respectively, fast on horizontal, lower cam shafts 53, 54, journalled above the base of the machine. Each of the horizontal cam shafts 53, 54 is provided, substantially intermediate its ends, with a cam barrel 55 having a groove 56 formed on its outer surface, in which is disposed a follower 57 on the end of a vertical lever 58. Each lever 58 is connected through a link 59 with the rear ends of one pair of blank advancing slide rods 19, 19' or 20, 20'. The groove 56 in the cam barrels 57 are arranged with their corresponding lever actuating surfaces spaced 180° apart on their respective shafts, so that as the shafts rotate in unison, the cams are timed to operate the levers 58 alternately. As a result, the two pairs of blank advancing slide rods 19, 19' and 20, 20' operate alternately to advance the blanks to the forming and welding positions at the forward ends of the mandrels.

Figure 4:
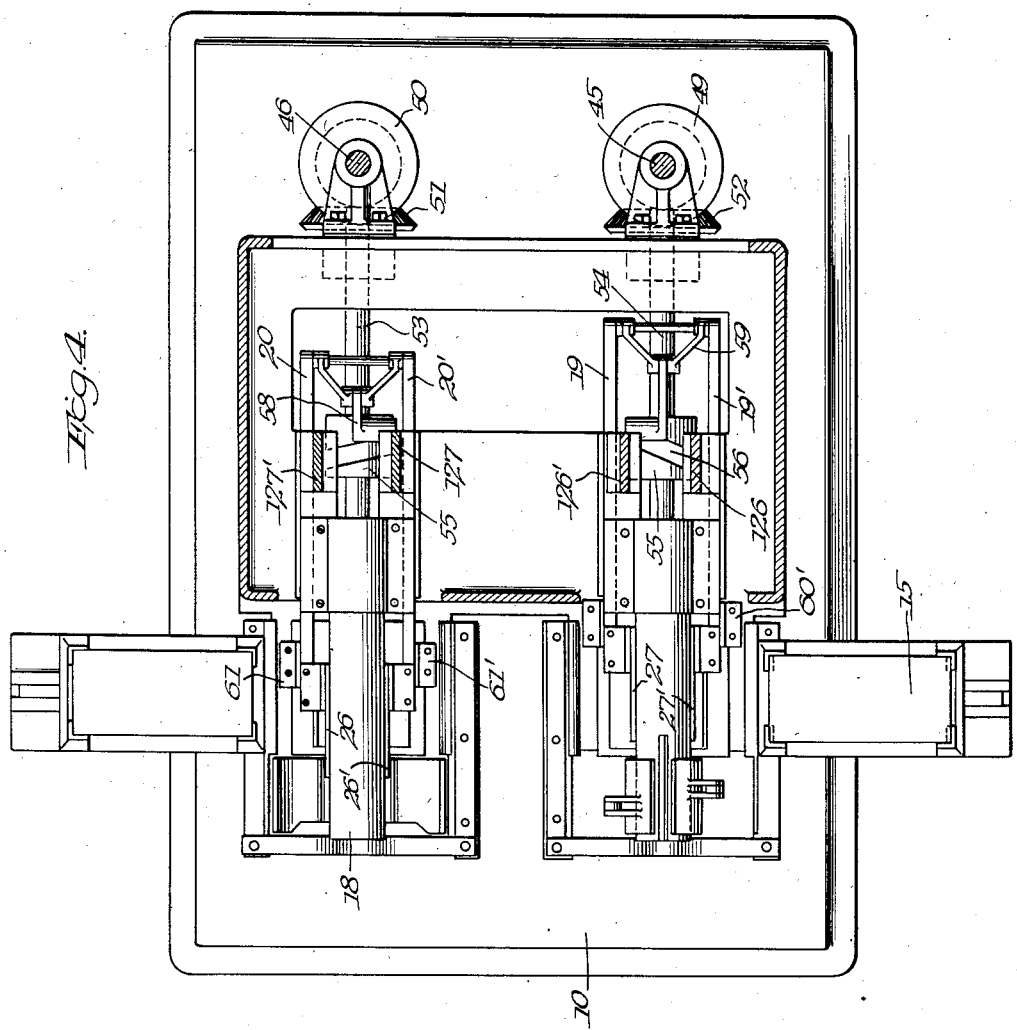
Figure 4 is a horizontal section on a horizontal plane above the body forming and welding mandrels.

As pointed out in the copending application referred to above, each pair of slides 19, 19' and 20, 20' (Figs. 1 and 4) carry downwardly projecting blank advancing abutments 60, 60', 61, 61'. At the rearwardly retracted position, as shown at the right in Figure 4, these abutments are positioned behind the rear edges of the blanks fed inwardly from the stack 15. As the slide rods 19, 19' are advanced, the abutments 60, 60' move the blanks forwardly to the forming and welding position. Simultaneously, the strippers 27, 27' which project upwardly and forwardly from the slide rods 19, 19' engage the rear end of a previously formed can body to strip the same from the mandrel. As pointed out in the aforesaid application, the strippers 27, 27' slide along flattened portions on the sides of the mandrels.

Figure 2:
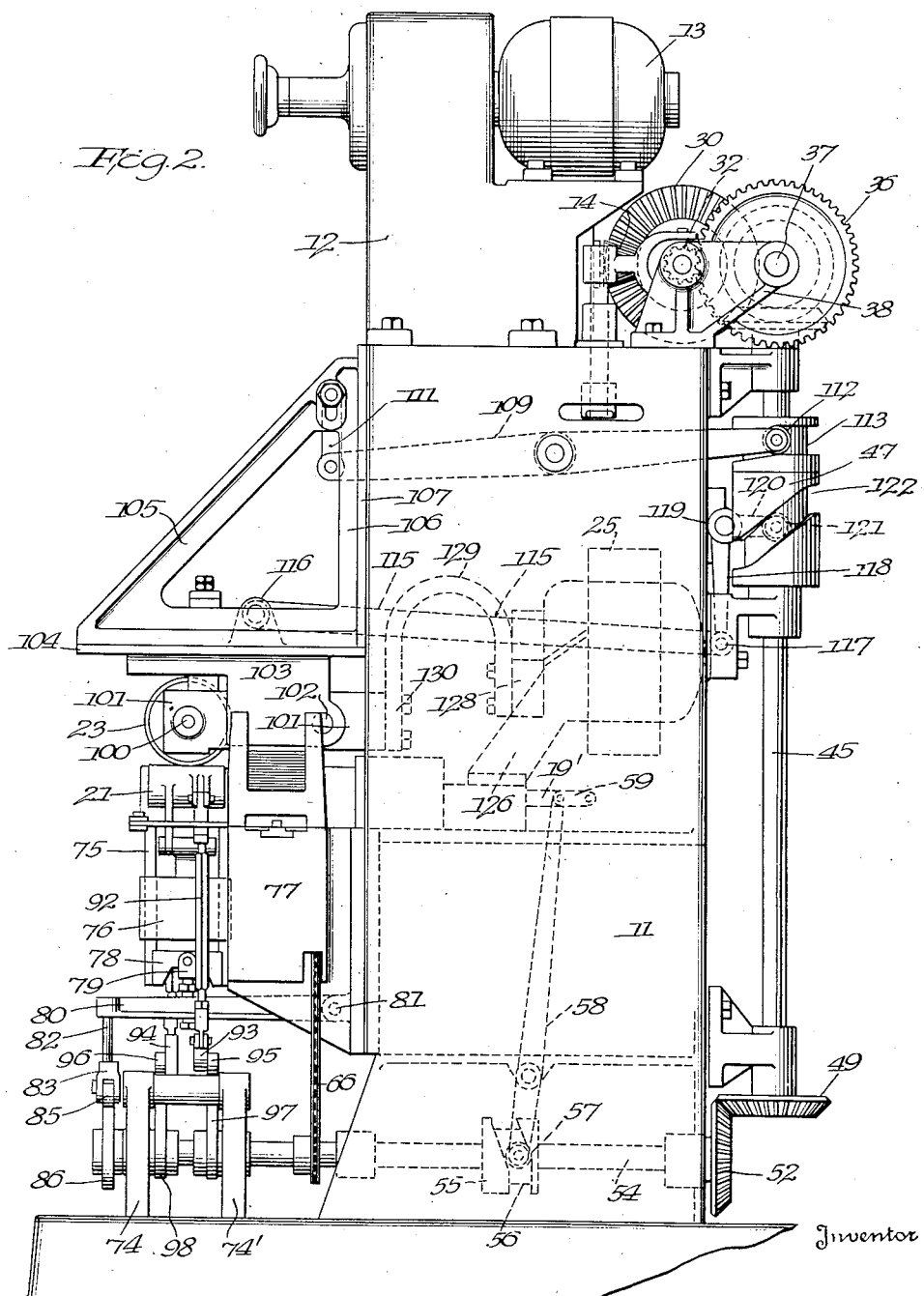
Figure 2 is a side elevation of the machine of Figure 1.
Figure 3:
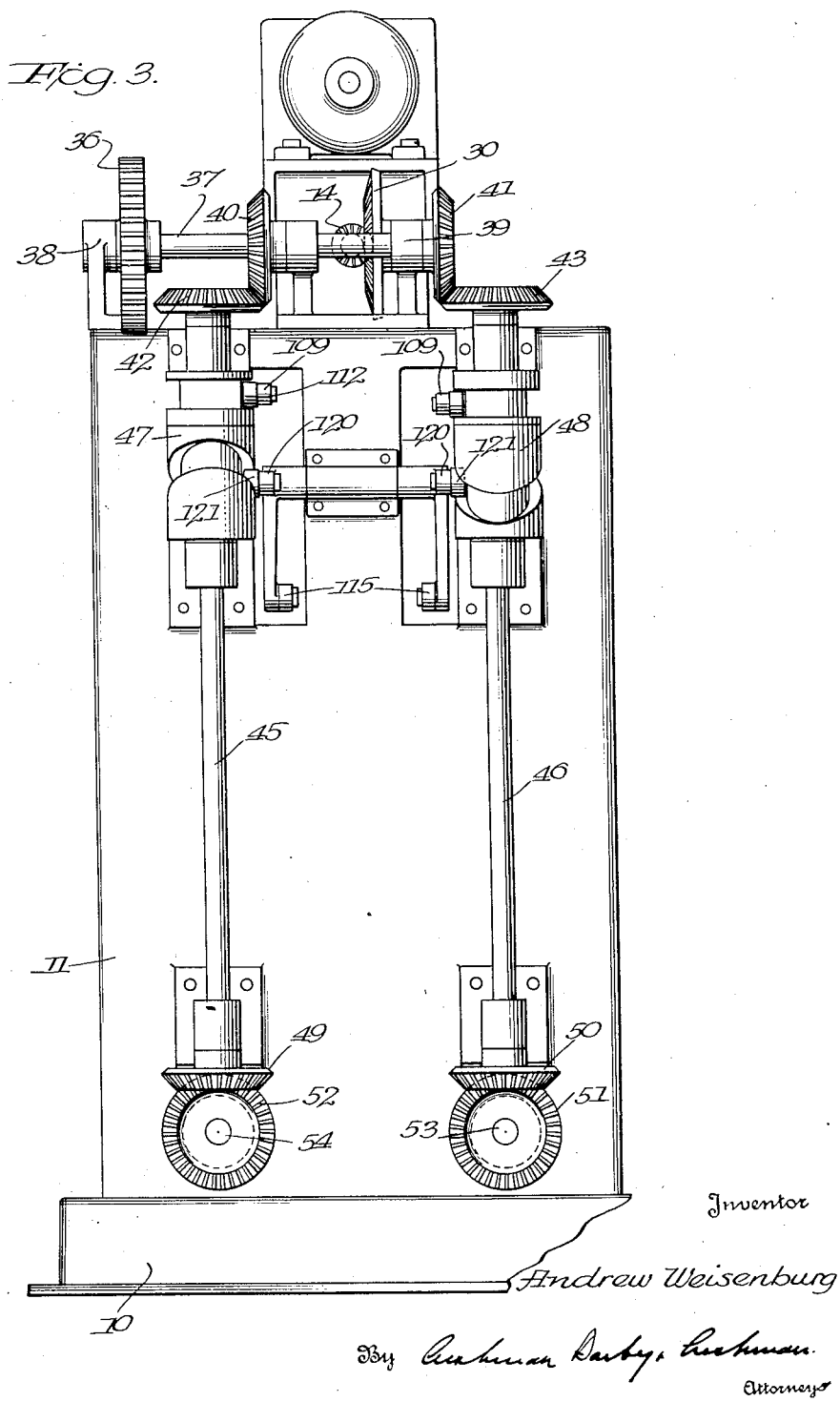
Figure 3 is a rear elevation.

As shown in Figures 1 and 2, the two lower parallel, horizontal cam shafts 53, 54 carry sprockets or the like 63, 64, respectively, about which are trained chains 65, 66, connected at their upper ends to sprockets 67, 68 associated with the blank infeed mechanism. Each blank feed includes a suction cup device 69, 70 adapted to pull a blank downwardly from the bottom of the stack into position where it may be fed laterally into the machine by an appropriate slide, for instance, of the type shown in detail in the copending application. The respective suction cups, horizontal slides and their operating links and levers are driven by the sprockets 67, 68, to operate upon the blanks to feed the blanks into the machine alternately, first from one stack and then from the other. The blanks are fed laterally into the machine into position to be advanced longitudinally of the respective mandrels by the blank feeding abutments 60, 60' and 61, 61'.

The horizontal cam shafts 53, 54 are journalled at their forward ends in two pairs of brackets 73, 73' and 74, 74', as shown in Figures 1 and 2. These shafts carry cams for operating the blank forming wings and the clamping plungers which operate in advance of the wings to firmly clamp the blanks to the undersurfaces of the mandrel so as to assure accurate forming of the blanks into cylindrical shape. The clamping plungers 75 are slidably mounted in a block 76 which projects forwardly from a bracket 77 mounted on the front of the main frame 11. The plungers are connected at their lower ends to a head 78, attached to a link 79 carried by a longitudinally arranged lever 80 pivoted to the frame at 81 and connected at its outer end through a link 82 to a transverse lever 83. The latter is pivoted at 84 to the brackets 74 and has a cam following roller 85 on its free end. The roller is supported upon the periphery of a cam 86 fixed to the front end of the cam shaft 54. A similar assembly is associated with the other mandrel and the latter is actuated by a similar cam 86' on the shaft 53.

The cam forming wings 21 are pivotally connected at 90 to an upwardly projecting portion of the block 76. Each wing also has a pivotal connection to an adjustable operating link 91, 92 connected respectively to levers 93, 94, pivoted to the brackets 74, 74'. The cross levers 93, 94 carry cam followers 95, 96 in engagement with the peripheries of cams 97, 98, fixed on the shaft 54. One cam is set slightly in advance of the other to cause one wing to close before the other, to assure a proper lapped joint at the side seam of each blank.

A similar set of instrumentalities is arranged to operate the cam forming wings 22. The latter are driven by similar cams on the shaft 53, which are offset 180° with respect to the cams on the shaft 54, whereby the respective pairs of can forming wings operate alternately.

For the details of construction of each mandrel 17, 18 and the carriages for the welding wheels 23, 24, reference is made to the copending application of Graham and Jackman, referred to above. As shown in Figure 2, the welding wheel 23 is journalled at 100 in the forward end of a lever arm 101 pivoted at 102 to a carriage 103 slidably mounted for horizontal movement on the lower, horizontal leg 104 of a triangular bracket 105. The vertical leg 106 of the bracket is mounted in tracks 107, 108 on the front vertical face of the main frame 11, for vertical sliding movement under the influence of a horizontal lever 109 pivoted to the frame at 110 and connected to the bracket by an adjustable link 111. The rear end of the lever 109 carries a cam following roller 112 disposed in a cam groove 113 associated with the barrel 47. Thus, as the barrel 47 on the vertical cam shaft 45 rotates, the lever 109 is rocked in a vertical plane to impart vertical reciprocations to the bracket 106, the carriage 103, the lever arm 101 and the welding wheel 23, to move the latter into and out of contact with the can body blank wrapped into cylindrical shape around the mandrel 17.

Horizontal reciprocations are imparted to the carriage 103, in timed relation to the vertical movements thereof, by means of a link 115 (Fig. 2) connected at its forward end to the carriage at 116 and pivoted at its rear end 117 to a downwardly projecting arm of a bell crank 118 (Fig. 2). The bell crank is pivoted to the main frame at 119 and has a rearwardly projecting arm 120 carrying a cam following roller 121 in a cam groove 122 formed on the periphery of the barrel 47. Rotation of the barrel 47 oscillates the bell crank which, through the link 115, reciprocates the carriage to move the welding wheel 23 along the side seam of the can body on the mandrel 17.

Similar mechanisms impart like movements to the welding wheel 24. It should be noted that the cam grooves in the barrels 47, 48 are oppositely disposed or are spaced 180°, one with respect to the other, whereby the movements of the two wheels are timed to operate alternately.

Current is delivered to the two sets of welding instrumentalities from the single transformer 25. The transformer is preferably supported (Figs. 2 and 4) by a bracket having two pairs of downwardly projecting legs 126, 126' and 127, 127', one pair connected with each mandrel. The legs serve as conductors to effect a flow of welding current to each mandrel. The other terminal of the secondary of the transformer carries a transverse bar 128 having its ends inclined downwardly and each connected to a heavy, flexible conductor 129, each of which is connected as at 130 to the rear end of one of the lever arms 101 carrying the electrode wheels, whereby welding current is conducted to the latter.

Figure 7:
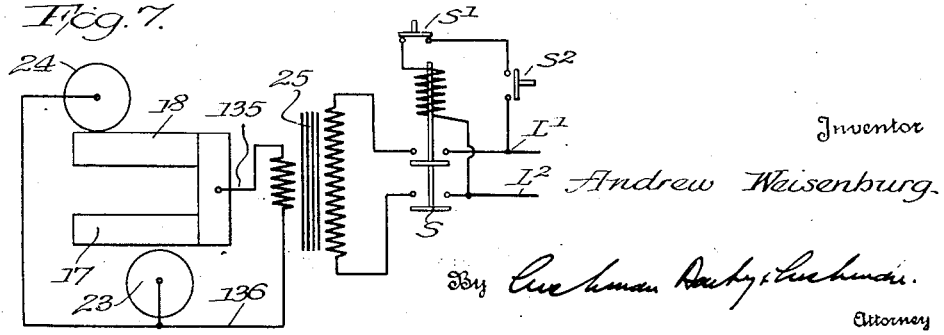
Figure 7 is a circuit diagram of the machine.

A preferred circuit diagram is shown in Figure 7, wherein the transformer 25 is shown as having one connection 135 to the two mandrels, 17, 18 in parallel, and another connection 136 to the electrode wheels 23, 24 in parallel. The flow of current to the primary of the transformer 25 from the main lines L1, L2 is preferably controlled by a solenoid-operated switch S. The solenoid in turn is controlled by a pair of limit switches s1, s2, one of which is preferably connected to the clutch operating handle 35 and the other associated with either or both of the cam barrels 47, 48 in a manner similar to the limit switch shown in the aforesaid copending application.

Figure 6:
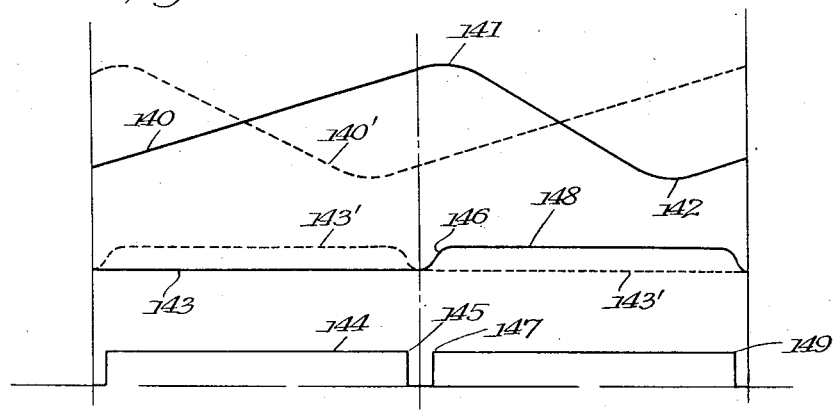
Figure 6 is a timing diagram.

A diagram showing a preferred timing arrangement is shown in Figure 6. The continuous line 140 represents the horizontal movements of the first electrode wheel 23 and the broken line 140' the corresponding movements of the other wheel 24. At point 141, the first wheel has reached its limit of forward movement in its welding stroke and at point 142 it has been completely withdrawn, to its rearmost position. Solid line 143 represents the vertical movement of the electrode wheel 24 and the broken line 143', the corresponding movement of the other electrode wheel. Solid line 144 represents the flow of current to the electrodes and the mandrels.

It will be noted that, during the forward movement of the wheel 23, as the line 140 approaches the point 141, reading from left to right, the line 143 is at the low position, representing the lowered position of the wheel, in contact with the work. At point 145, the current control line 144 indicates that the current to both welding wheels and mandrels is cut off. This preferably occurs just prior to the commencement of the lifting movement of the wheel 23, as indicated by the curve 146 in the line 143 and just prior to the end of the forward movement of the wheel. The circuit is immediately re-closed at point 147 and the second welding wheel 24 begins its welding operation. Simultaneously, the first welding wheel 23 starts its return movement, out of contact with the work, as indicated by the raised portion 148 of line 143. Of course, there will be no flow of welding current since the wheel 23 is in the upper position during its return movement.

At the end of the welding stroke of wheel 24 (line 140'), the current is again cut off, as at 149, and the cycle of operation is repeated.

From the foregoing description, it is thought that the mode of operation of the illustrative machine shown in the accompanying drawings will be apparent to one skilled in the art. Two stacks of blanks are placed in the brackets associated with the stack feeds on opposite sides of the machine. Blanks are fed alternately from the bottoms of the two stacks, first downwardly by the suction cups 69, 70 and then laterally into the machine by reciprocating slides driven by the sprocket wheels 67, 68, but not shown in detail herein. Reference is made to the copending application of Graham and Jackman for a suitable form of stack feed. The blanks alternately fed into the machine, as aforesaid, are advanced longitudinally of the mandrels 17, 18, to an operative position overlying the blank wrapping wings 21, 22, respectively. This longitudinal feed of blanks occurs alternately, first under one mandrel and then under the other. While one blank is being advanced toward the forward, operative end of the mandrel, a welded can body is simultaneously stripped from that end by one or another of the two pairs of stripper fingers 26, 26', or 27, 27'. During the time that a blank is being advanced longitudinally under one mandrel and while that blank is being clamped therebeneath and wrapped around the mandrel, a formed blank on the other mandrel is receiving welding current from the associated welding wheel during its forward traverse along the side seam of that blank. Also, during the advance and forming of the first mentioned blank, the welding wheel associated with that mandrel is being returned to its retracted, starting position. The latter welding wheel is in its raised position during the rearward movement and, consequently, no current can flow from it to the adjacent mandrel.

As soon as the blank has been wrapped about the mandrel, the associated welding wheel starts its forward welding movement. The wrapping wings associated with the other mandrel open, the welded can body thereon is stripped therefrom, a new blank is advanced, and that welding wheel starts its return movement while the other is completing its welding stroke. In this manner, the cycle is repeated and welded can bodies are discharged alternately from the two mandrels.

The method of the present invention makes maximum use of the current output of a single transformer. It is, therefore, desirable, for the sake of economy, to use a transformer having a normal current output of sufficient value to perform only a single welding operation at a time. The load on the current supply line is substantially constant, since there are no long periods of inactivity, followed by other relatively long periods of heavy current consumption. The continuous, alternate use of the current output of the transformer makes it possible to use a smaller transformer than would be the case if two welding operations were performed simultaneously.

As a result of the arrangement of parts described above, and as a consequence of the method steps explained, it is thought that all of the objects and advantages mentioned at the outset of this specification are accomplished.

The invention is not limited to the details of construction shown in the accompanying drawings and described above, nor to the particular sequence of method steps recited, but covers all modifications falling within the scope of the appended claims or their equivalents.

I claim:

1. A can body welding machine comprising a pair of mandrel electrodes, each adapted to be embraced by and to support a can body, a single transformer serving as a source of welding current, a pair of welding electrodes, one adapted for cooperation with each mandrel, means for permanently connecting the mandrel electrodes and the welding electrodes to the transformer in parallel, respectively, means for establishing welding cooperation between one welding electrode, one mandrel electrode and a can body thereon while the other welding electrode and its mandrel electrode are in inoperative spaced apart relation, thereby to form a continuously welded side seam in said body, and means operative at the termination of that welding operation for establishing welding cooperation between the last-mentioned welding electrode, its mandrel electrode and a can body thereon while the first-mentioned pair of electrodes are in inoperative spaced apart relation, thereby to weld side seams of can bodies alternately on said mandrels.

2. A can body forming and welding machine comprising a pair of mandrels, means associated with each mandrel for forming can blanks into cylindrical shape thereon, each of said mandrels comprising a welding electrode, a single source of welding current connected to said mandrels in parallel, a pair of welding electrodes in parallel circuits in series with said mandrels when in electrical contact therewith, and means for establishing electrical contact, alternately, between each of said welding electrodes and its mandrel electrode to effect a flow of welding current from said source through said electrodes to weld can bodies alternately on the two mandrels.

3. A can body forming and welding machine comprising a pair of mandrels, means for alternately forming separate, individual can body blanks into cylindrical shape on the two mandrels, side seam welding means comprising a pair of electrodes associated with each mandrel, a single transformer, means for conducting welding current from said transformer through said welding means alternately to weld the side seams of can bodies, first on one mandrel and then on the other, said can body forming means being timed to form a blank on one mandrel during the welding of a formed blank on the other mandrel.

4. A can body forming and welding machine comprising means for supporting two independent stacks of can blanks, means for alternately feeding blanks from the stacks into the machine, means for alternately advancing the blanks so fed to two forming stations, means at said stations for alternately forming the blanks into cylindrical shape, two pairs of welding electrodes positioned to weld the side seams in the cylindrical blanks, each pair comprising a mandrel electrode about which the blank forming means wrap and securely clamp the blanks and a wheel electrode mounted for movement toward and from the mandrel and for movement along the wrapped and clamped blanks, and means for alternately moving the wheel electrodes into contact with can blanks on the mandrel electrodes and longitudinally of said blanks in contact therewith, thereby alternately conducting welding current through said pairs of electrodes while in contact with said blanks to weld the formed blanks alternately.

5. A can body forming and welding machine comprising means for supporting two independent stacks of can blanks, means for alternately feeding blanks from the stacks into the machine, means for alternately advancing the blanks so fed to two forming stations, means at said stations for alternately forming the blanks into cylindrical shape alternately with the advancing operations, two pairs of welding electrodes positioned at said stations to weld the side seams in the cylindrical blanks, means for relatively moving the electrodes of each pair into welding contact with the associated cylindrical blanks alternately, a single transformer having a normal current output adapted to perform not more than one welding operation at a time, and means to conduct current from said transformer to the two pairs of electrodes and alternately through said pairs and the associated blanks when the latter are in such welding contact.

6. A can body forming and welding machine comprising duplicate sets of can body forming instrumentalities, duplicate pairs of welding means associated therewith, each pair comprising a mandrel electrode about which said forming instrumentalities wrap and securely clamp can bodies and a wheel electrode mounted for movement along the wrapped and clamped blanks, a single source of power, power transmission means connecting said source to said instrumentalities and to said wheel electrodes and including means rendering said instrumentalities operative alternately to wrap and clamp blanks about the associated mandrels to form a can body by the operations of one set first and then to form a can body by the operations of the other set, said power transmission means including means for moving the wheel electrodes alternately along the bodies wrapped about the mandrel electrodes, a single source of welding current and connections rendering each of said pairs of welding means operative alternately and during the movements of the wheel electrodes along the bodies.

7. A can body forming and welding machine comprising a pair of mandrels adapted to support blanks formed into cylindrical shape thereon, a pair of welding wheels, each mounted for movement longitudinally of one of said mandrels, means for alternately moving the wheels simultaneously in opposite directions along the mandrels, and means for alternately lowering and alternately raising the wheels into and out of contact with the blanks on the mandrels, in timed relation to the longitudinal movements of the wheels.

8. A can body forming and welding machine comprising a pair of mandrels, means for forming blanks into cylindrical shape alternately on the two mandrels, a pair of welding wheels, one associated with each mandrel, means for lowering one wheel into contact with a blank formed on the associated mandrel and for simultaneously raising the other wheel out of contact with the blank on the other mandrel, means for advancing the first mentioned wheel longitudinally of the mandrel in contact with the blank to weld the side seam thereof, and means for simultaneously retracting the other welding wheel longitudinally of the mandrel while out of contact with a blank thereon.

9. A can body forming and welding machine comprising a pair of mandrels, means for forming blanks into cylindrical shape alternately on the two mandrels, a pair of welding wheels, one associated with each mandrel, means for lowering one wheel into contact with a blank formed on the associated mandrel and for simultaneously raising the other wheel out of contact with the blank on the other mandrel, means for advancing the first-mentioned wheel longitudinally of the mandrel in contact with the blank to weld the side seam thereof, means for simultaneously moving the other welding wheel longitudinally of the mandrel while out of contact with the can body blank previously formed and welded thereon, and means for stripping said can body blank from the last-mentioned mandrel during said retracting movement of the second-mentioned welding wheel.

10. A can body welding machine comprising a pair of mandrel electrodes adapted to support can blanks formed to cylindrical shape, a pair of cooperating electrodes positioned opposite the side seams of the blanks, a single source of low voltage welding current of sufficient value to perform only a single welding operation at a time, means permanently connecting both mandrels and both cooperating electrodes to said source of current, and means for alternately establishing welding connection between the two mandrels and their cooperating electrodes, whereby the can body blanks are welded alternately on the two mandrels.

11. A can body welding machine comprising a pair of mandrel electrodes adapted to support cylindrical can bodies, a pair of cooperating electrodes positioned opposite the side seams of the bodies, means for moving the latter electrodes toward and from the mandrel electrodes, into and out of welding contact with the bodies thereon, and longitudinally of the bodies to form continuously welded side seams, and a single source of low voltage welding current for said electrodes of sufficient value to perform only a single welding operation at a time, said electrode moving means being timed to move the electrodes into contact with the can bodies and longitudinally thereof, alternately, whereby the can body blanks are welded alternately on the two mandrels.

12. A can body welding machine comprising a pair of mandrel electrodes adapted to support cylindrical can bodies, a pair of wheel electrodes positioned opposite the side seams of the bodies, a single transformer permanently connected to both pairs of electrodes, means for alternately moving the wheel electrodes into contact with bodies on the mandrel electrodes and for alternately moving the wheel electrodes longitudinally of the side seams thereof, and means operating in timed relation to the electrode moving means for interrupting the flow of current to the primary side of the transformer between each two welding operations.

13. A can body welding machine comprising a pair of mandrel electrodes adapted to support cylindrical can bodies, a pair of wheel electrodes positioned opposite the side seams of the bodies on the mandrel electrodes, means for alternately moving the wheel electrodes toward and from the bodies, into and out of electrical contact therewith, means for alternately moving the wheel electrodes longitudinally of the side seams of the can bodies, and automatic means operating in synchronism with the electrode moving means for interrupting the flow of welding current to both pairs of electrodes prior to movement of each wheel electrode out of electrical contact with the associated body.

14. A duplex can body welding machine comprising two pairs of welding electrodes, a single step-down transformer having one side of the secondary thereof permanently connected to one electrode of each pair and the other side of the secondary permanently connected to the other electrodes of both pairs, a switch for closing and opening the primary side of the transformer, means for alternately establishing welding contact between each pair of electrodes and a can body blank, whereby the current from said transformer flows alternately through the pairs of electrodes and performs welding operations alternately, and means for periodically opening the switch to deenergize the transformer between each two welding operations.

ANDREW WEISENBURG.